United States Patent [19]
Fujioka et al.

[11] Patent Number: 4,641,069
[45] Date of Patent: Feb. 3, 1987

[54] PLURAL MOTOR CHANGEOVER CONTROL SYSTEM

[75] Inventors: Yoshiki Fujioka, Yamato; Mitsuhiko Hirota, Tokyo, both of Japan

[73] Assignee: Fanuc Ltd, Minamitsuru, Japan

[21] Appl. No.: 631,559

[22] PCT Filed: Nov. 11, 1983

[86] PCT No.: PCT/JP83/00408
§ 371 Date: Jul. 10, 1984
§ 102(e) Date: Jul. 10, 1984

[87] PCT Pub. No.: WO84/02040
PCT Pub. Date: May 24, 1984

[30] Foreign Application Priority Data
Nov. 13, 1982 [JP] Japan .................. 57-199233

[51] Int. Cl.$^4$ .................................. G05B 11/32
[52] U.S. Cl. ........................ 318/625; 318/51; 318/71; 318/52; 318/798
[58] Field of Search ............ 318/625, 51, 53, 71, 318/52, 798

[56] References Cited

U.S. PATENT DOCUMENTS

| | | | |
|---|---|---|---|
| 4,257,103 | 3/1981 | Suzuki et al. | 318/625 X |
| 4,297,624 | 10/1981 | Komiya | 318/625 X |
| 4,422,027 | 12/1983 | Mohlere | 318/625 X |
| 4,433,275 | 2/1984 | Imazeki et al. | 318/625 X |
| 4,464,615 | 8/1984 | Rodi | 318/625 |

FOREIGN PATENT DOCUMENTS 2088592 6/1982 United Kingdom ............... 318/625

*Primary Examiner*—Benjamin Dobeck
*Attorney, Agent, or Firm*—Staas & Halsey

[57] ABSTRACT

A plural motor changeover control system for using a plurality of motors (1a, 1b), the power outputs of which differ, by successively switching among the motors. A conversion table (32a, 32b) corresponding to a motor designated for operation from among the plurality of motors (1a, 1b) is selected, and an amplitude command is fetched from the selected conversion table, which command corresponds to a velocity error, which is a difference between an actual velocity of the designated motor and a commanded velocity. The amplitude command is applied to the servo control circuit to control the designated motor.

9 Claims, 6 Drawing Figures

PLURAL MOTOR CHANGEOVER CONTROL SYSTEM

DESCRIPTION

BACKGROUND OF THE INVENTION

This invention relates to a plural motor changeover control system which, by means of the same control apparatus, controls changeover among a plurality of motors the outputs of which differ.

In a machine tool or the like equipped with a plurality of motors having different outputs, the motors are driven alternatively. By way of example, in a turning center or the like, a turning machining motor is driven when turning machining is performed, thereby to rotate a workpiece at a commanded rotational velocity to carry out the turning operation. When a screw hole, hole or keyway is to be formed after the turning operation, a spindle is positioned at a predetermined point, upon which a motor for rotary tool is driven to rotate the tool, thereby drilling a hole into the stationary workpiece. Since the motor for the turning operation and the motor for the rotary tool are so arranged that while one is being driven the other is not, it has been contemplated to control the motors by a single servo control apparatus. If it were possible to apply such a servo control apparatus commonly for the two motors, the results would be very beneficial as it would make it possible to greatly simplify the arrangement and reduce the cost of the equipment. If the maximum outputs of the turning motor and rotary tool motor were identical, common application of the servo control apparatus would be very simple to achieve. In general, however, the maximum outputs of these motors differ by a wide margin, so that common application is difficult. Even if a servo control apparatus were to be applied to both motors, neither a significant simplification nor a significant reduction in cost would be achieved.

Moreover, in order to achieve such common application, it would be necessary to provide a switching circuit for the signal lines that transmit feedback signals from the motors, in addition to a switching circuit for the power lines that transmit the motor drive signals. These switching circuits use separately installed switching units that rely upon relay circuits. When relays are used, however, it is necessary to provide a power supply for driving the relays. This requires a great amount of space and complicated wiring.

SUMMARY OF THE INVENTION

Accordingly, an object of the present invention is to provide a plural motor changeover control system which makes it possible to commonly apply a control unit with ease, and which is simple in construction and low in cost.

Another object of the present invention is to provide a plural motor changeover control system which has a signal line switching circuit of a simple arrangement, and which is improved to dispense with the need for a driving power supply and a great amount of space.

A plural motor changeover control system according to the present invention is for using a plurality of motors, the outputs of which differ, by successively switching among the motors. The system has a single servo control circuit used in controlling the plurality of motors, and velocity error-amplitude command tables having characteristics corresponding to the plurality of motors the outputs of which differ. A conversion table corresponding to a motor designated for operation from among the plurality of motors is selected, and an amplitude command is fetched from the selected conversion table, which command corresponds to a velocity error, which is a difference between an actual velocity of the designated motor and a commanded velocity. The amplitude command is applied to the servo control circuit to control the designated motor. The system is additionally provided with a signal line switching circuit for switching among, and applying to the servo control circuit, feed back signals from the plurality of motors, the signal line switching circuit being an analog switch.

According to the present invention, an advantage is provided wherein a servo control circuit is commonly applied to enable changeover control of a plurality of motors having different outputs. In addition, to cope with motors producing small power outputs, commensurate amplitude, phase and slip commands are applied. Accordingly, a resulting advantage is that an output torque characteristic can be satisfied by a small current corresponding to a velocity error. Further, control is possible in accordance with optimum motor characteristics, such as control of the generation and reductions of motor heat. In addition, since the signal line switching circuit for applying the motor feedback signals to the servo control circuit is an analog switch, an advantage gained is that a power supply for driving the switch need not be separately provided. Also, due to semiconductor construction, little installation space is required and wiring is facilitated. Another practical advantage is that the power supply of the servo control circuit can be utilized.

DETAILED DESCRIPTION OF THE PREFERRED EMBODIMENTS

An embodiment of the present invention will now be described in detail with reference to the drawings to further clarify the present invention.

Figure 1:
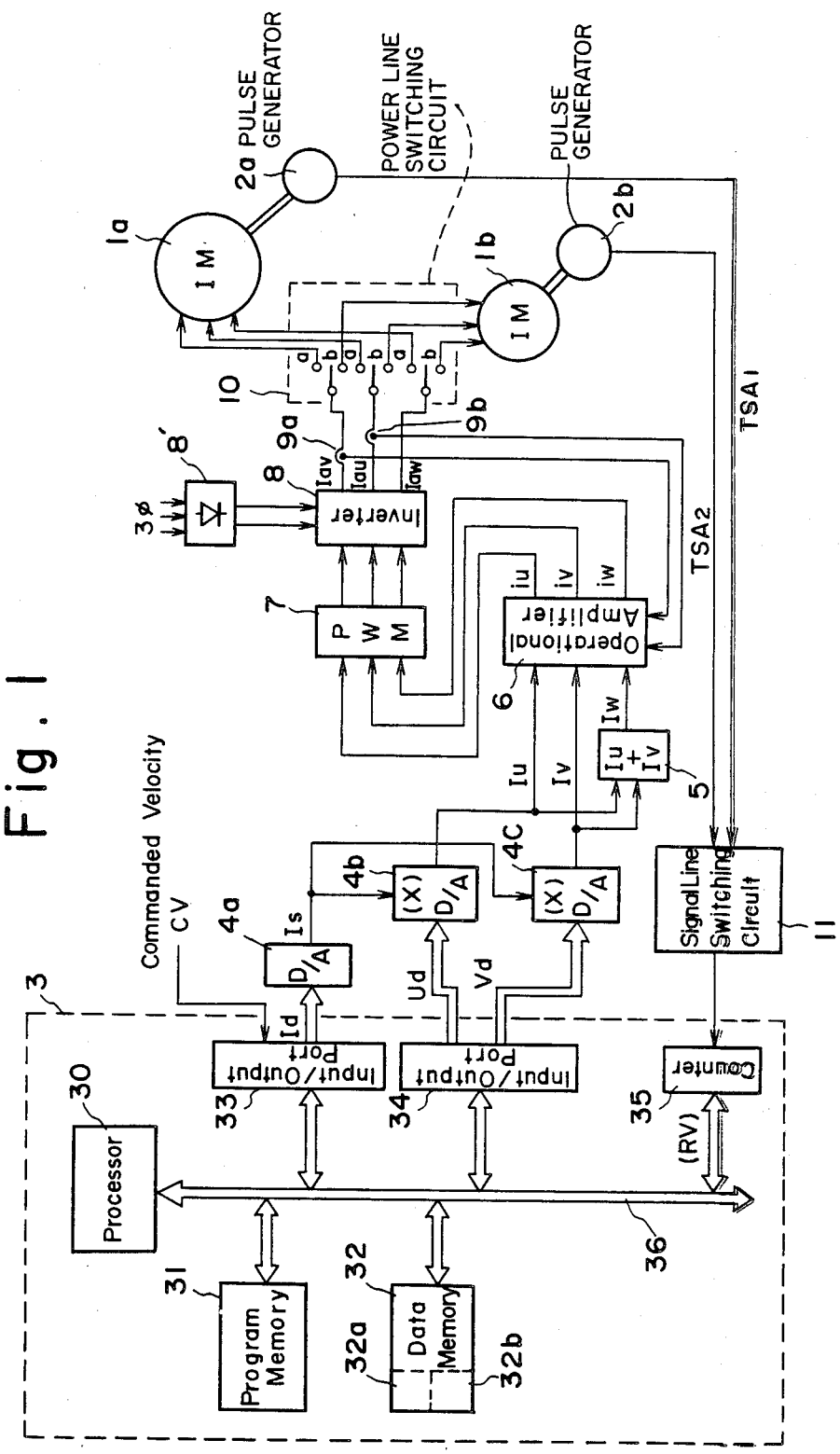
FIG. 1 is a block diagram of an embodiment of the present invention.

FIG. 1 is an overall block diagram of a control circuit embodying the present invention. In FIG. 1, numerals 1a, 1b denote three-phase induction motors. By way of example, the induction motor 1a rotates the spindle of a machine tool, and the induction motor 1b rotates a tool. Numerals 2a, 2b denote pulse generators for producing velocity pulses TSA in dependence upon rotation of the AC motor 1. Numeral 3 designates an arithmetic circuit acting as part of a control section for the induction motors 1a, 1b. The arithmetic circuit 3 senses the actual velocity RV of the induction motors 1a, 1b on the basis of the velocity pulses TSA from the pulse generators 2a, 2b, and produces an amplitude command Id as well as U- and V-phase phase commands Ud, Vd in dependence upon the difference between the actual velocity and a commanded velocity CV. The arithmetic circuit 3 is composed of a processor 30 for performing processing, a program memory 31 storing a control program, a data memory 32 for storing various data, input/output ports 33, 34, a counter 35, and an address/data bus 36 interconnecting these components. The processor 30, in accordance with the control program in the program memory 31, reads via the bus 36 a value recorded in the counter 35, which counts the velocity pulses TSA, obtains the actual velocity RV of the induction motors 1 from the difference between the read value and the value read previously, and calculates a velocity error ER, which is the difference between the actual velocity and the externally applied commanded velocity CV. Next, the processor 30 accesses a velocity error—amplitude command (ER-Id) conversion table, a velocity error—phase (ER-$\Psi$) conversion table, and a velocity error—slip frequency (ER-Ws) conversion table, these tables being provided in the data memory 32, and obtains a corresponding amplitude command Id, a corresponding phase $\Psi$, and a corresponding slip frequency Ws. The processor 30 delivers the amplitude command Id to the input/output port 33 through the bus 36. In accordance with the control program, and based on the actual velocity RV obtained from the value in the counter 35, the processor 30 accesses an actual velocity—angular frequency (RV-Wo) conversion table in the data memory 32, reads out a corresponding angular frequency Wo, calculates the U-phase phase command Ud [sin (Wot+Wst+$\Psi$)] and the V-phase phase command Vd [sin (Wot+Wst+$\Psi$+($\frac{2}{3}$)$\pi$], reads out the U- and V-phase phase commands Ud, Vd, and delivers these commands to the input/output port 34 through the bus 36.

Figure 2:
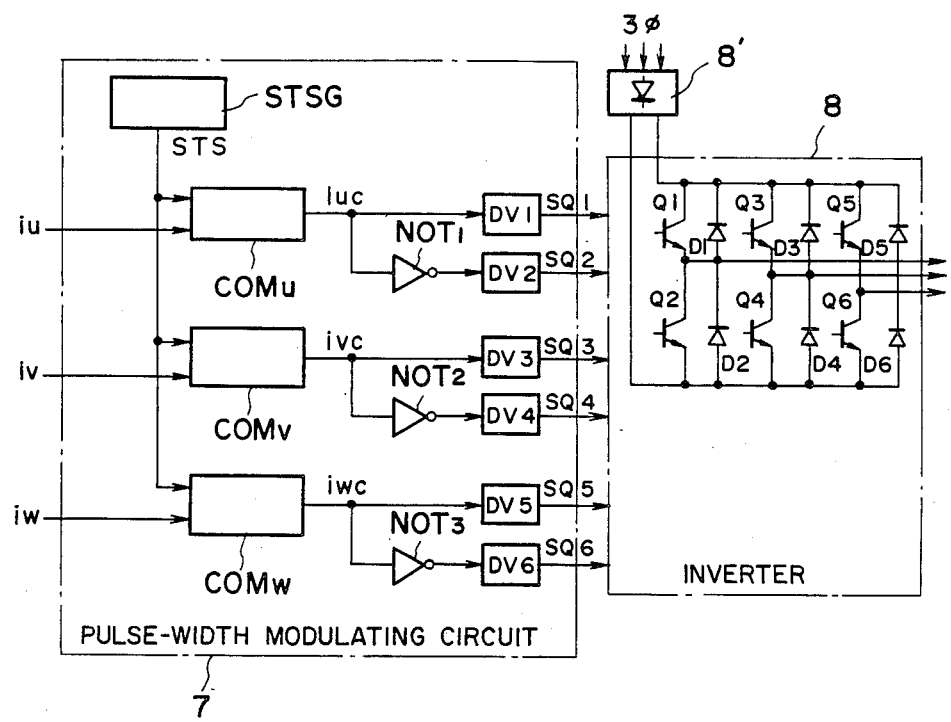
FIG. 2 is a block diagram illustrating a principal portion of the arrangement of FIG. 1.
Figure 3:
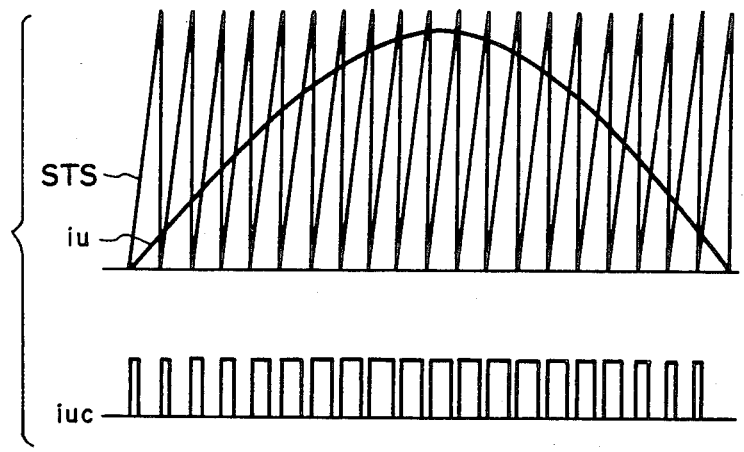
FIG. 3 is a waveform diagram for describing the operation of the arrangement of FIG. 2.

Numeral 4a denotes a digital/analog conversion circuit (DA circuit) for converting the digital amplitude command Id into an analog amplitude command Is. Numerals 4b, 4c denote multiplying-type digital/analog conversion circuits for converting he repetive U- and V-phase current commands Ud, Vd into analog quantities and for multiplying these analog quantities by the analog amplitude command Is to produce analog U- and V-phase current commands Iu, Iv, respectively. Numeral 5 designates a W-phase current forming circuit for forming a W-phase current command Iw from the analog U- and V-phase current commands Iu, Iv. Numeral 6 represents an operational amplifier for obtaining the difference between actual phase currents and the commanded currents Iu, Iv, Iw in the respective phases. The operational amplifier 6 is composed of an operational amplifier for calculating the difference between the commanded currents Iu, Iv, Iw in the respective phases, and the actual phase currents Iau, Iav, Iaw, respectively, and an arithmetic circuit for producing a W-phase phase current Iaw by adding Iav and Iau, which are sensed by current transformers 9a, 9b. Numeral 7 denotes a pulse-width modulating circuit, and numeral 8 inverter, controlled by an output signal from the pulse-width modulating circuit, for providing a DC voltage derived from an externally provided three-phase AC power supply and a rectifying circuit (a group of diodes and a capacitor) for rectifying the three-phase alternating current into a direct current. As shown in FIG. 2, the pulse-width modulating circuit 7 includes a sawtooth waveform generating circuit STSG, comparators COMu, COMv, COMw, NOT gates NOT$_1$ through NOT$_3$, and drivers DV$_1$ through DV$_6$. The inverter 8 includes six power transistors Q1 through Q6 and six diodes D1 through D6. The comparators COMu, COMv, COMw of the pulse-width modulating circuit 7 compare a sawtooth signal STS with the amplitudes of the three-phase AC signals iu, iv, iw, respectively, and produce a "0" output when the magnitude of STS is exceeded by iu, iv or iw. Thus, with respect to iu, the comparator COMu produces the current command iuc shown in FIG. 3. More specifically, pulse-width modulated three-phase current commands iuc, ivc, iwc dependent upon the amplitudes of iu, iv, iw are produced. These current commands iuc, ivc, iws are then converted into drive signals SQ1 through SQ6 by the NOT gates NOT$_1$ through NOT$_3$ and drivers DV$_1$ through DV$_6$, whereby the on/off action of the power transistors Q1 through Q6 constituting the inverter 8 is controlled. Numeral 8' denotes a rectifying circuit for the above-mentioned direct current feed, and numerals 9a, 9b denote current sensors each having a current sensing resistor for sensing the U- and V-phase actual phase currents Iav, Iau as voltage values. Numerals 10 denotes a power line switching circuit for connecting the inverter 8 to the induction motor 1a by connecting contacts to the a side, and for connecting the inverter 8 to the induction motor 1b by connecting the contacts to the b side. Numeral 11 designates a signal line switching circuit which, depending upon how switching is performed, connects either the pulse generator 2a or 2b to the counter 35 to apply the velocity pulses TSA, which are velocity feedback pulses, to the counter 35.

Next, the operation of the arrangement shown in FIG. 1 will be described for a case where the induction motor 1a is rotating at the actual velocity RV (i.e., in a case where the power line switching circuit 10 is connected to the a side and the pulse generator 2a is connected to the counter 35 by the signal line switching circuit 11).

The processor 30 of the arithmetic unit 3 reads the value in the counter 35, which counts the velocity pulses TSA, through the bus 36 to sense the actual velocity RV of the induction motor 1. Next, based on the error ER between the commanded velocity CV and the sensed actual velocity RV, the processor 30 accesses the ER-Is, ER-$\Psi$, and ER-Ws conversion tables from the data memory 32, obtains the amplitude command Id, the phase $\Psi$ and the slip frequency Ws, accesses the RV-Wo conversion table in the data memory 32, obtains the corresponding angular frequency Wo, calculates the U- and V-phase phase commands Ud, Vd and, via the bus 36, applies the amplitude command Id to the input/output port circuit 33 and the U- and V-phase phase commands Ud, Vd to the input/output port circuit 34. The amplitude command Id from the input/output port 33 is converted into an analog amplitude command Is by the digital/analog conversion circuit 4a, which command is then applied to the multiplying-type digital/analog conversion circuits 4b, 4c. Meanwhile, the U- and V-phase phase commands Ud, Vd are converted into analog quantities by the respective multiplying-type digital/analog conversion circuits 4b, 4c, which quantities are multiplied by the analog amplitude command Is to be converted into analog U- and V-phase current commands Iu, Iv. The U- and V-phase current commands Iu, Iv are applied to the W-phase current forming circuit 5, which produces the W-phase current Iw. The W-phase current Iw is applied to the operational amplifier 6 together with the U- and V-phase current commands Iu, Iv, respectively. The operational amplifier 6 receives the actual phase currents Iau, Iav from the converters 9a, 9b and forms the W-phase phase current Iaw. The operational amplifier 6 also produces three-phase AC signals iu, iv, iw, which are the differences between the three-phase current commands Iu, Iv, Iw and respective ones of the actual phase currents Iau, Iav, Iaw. In FIG. 2, the three-phase AC signals iu, iv, iw indicative of these differences are applied to the respective comparators COMu, COMv, COMw of the pulse-width modulating circuit 7. The comparators COMu, COMv, COMw compare the amplitudes of the three-phase AC signals iu, iv, iw with the amplitude of the sawtooth signal STS, and deliver as outputs three-phase current commands iuc, ivc, iwc produced by way of pulse width modulation. The outputs from the comparators are supplied to the NOT gates $NOT_1$ through $NOT_3$ and to the drivers $DV_1$ through $DV_6$, which generate the inverter drive signals SQ1 through SQ6. The inverter drive signals SQ1 through SQ6. The inverter drive signals SQ1 through SQ6 are applied to the bases of the power transistors Q1 through Q6, respectively, in the inverter 8 to control the on/off action of the power transistors Q1 through Q6 for supplying three-phase current to the induction motor 1a. The induction motor 1a will be controlled in a similar fashion until the motor eventually rotates at the commanded velocity.

The induction motor 1b is driven by a similar operation when the contacts of the power line switching circuit 10 are connected to the b side and the pulse generator 2b is connected to the counter 35 by the signal line switching circuit 11.

According to the embodiment of the present invention, the data memory 32 is provided with a conversion table 32a for the conversion from velocity error to amplitude, phase and slip for the induction motor 1a, and with a conversion table 32b for the conversion from velocity error to amplitude, phase and slip for the induction motor 1b.

Either the conversion table 32a or 32b is selected in a shift-like manner in synchronism with the switching performed by the switching circuits 10, 11.

Figure 4:
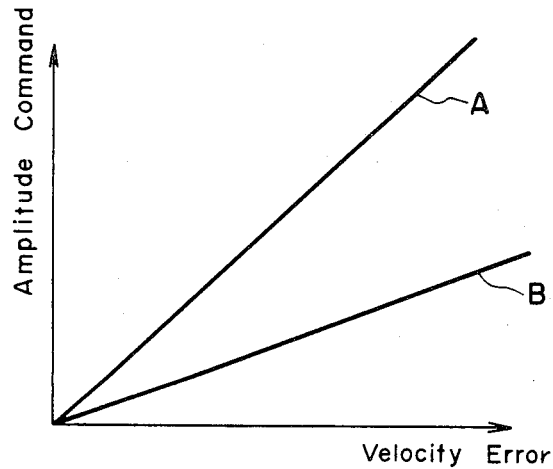
FIG. 4 is a conversion table characteristic used in the present invention.

This function is provided because the maximum outputs of the induction motors 1a, 1b differ from each other, and is for the purpose of delivering an amplitude command that corresponds to the maximum output. Specifically, if we assume that a current of 4I (Å) prevails at the maximum velocity error of the induction motor 1a and that the current of I (Å) prevails at the maximum velocity error of the induction motor 1b, then the amplitude command Id in both cases will be E volts when the same conversion table is used for both of the induction motors 1a, 1b. This amplitude command Id is applied as a voltage value. Therefore, a maximum amplitude command E will correspond to a current of 4I (Å) for the induction motor 1a, and to a current of I (Å) for the induction motor 1b. On the other hand, the feedback voltages, namely the actual phase current values, from the current sensors 9a, 9b will be 4IR and IR, respectively, where R is the value of each current sensing resistor. These values are different, despite the fact that the voltages which prevail at the maximum velocity error are the same. Accordingly, current sensors whose current sensing resistors have values that differ from each other must be separately provided for the respective induction motors 1a, 1b. This would not allow a servo control circuit to be applied commonly to both motors. Therefore, according to the embodiment of the present invention, a velocity error—amplitude command conversion table 32a having a characteristic of the kind indicated by A in FIG. 4 is provided for the induction motor 1a, and a velocity error—amplitude command conversion table 32b having a characteristic of the kind indicated by B in FIG. 4 is provided for the induction motor 1b. Similarly, velocity error—phase and velocity error—slip frequence conversion tables corresponding to the characteristics of the induction motors 1a, 1b are provided for each of these motors. In this way, the amplitude command voltage of, e.g., the induction motor 1a when the maximum velocity error prevails will be E and that of the induction motor 1b will be E/4, so that these will correspond to the above-mentioned currents of 4I, I, respectively. Thus, the feedback voltages from the current sensors will be 4IR, IR, the ratio whereof will be the same as that of the above-mentioned amplitude command voltages. This makes it possible to control induction motors having different outputs by using identical current sensors. Moreover, since a low-output motor will be provided with a current amplitude command commensurate with the output, the output characteristic can be satisfied by a small current which corresponds to the velocity error (slip).

In other words, even if a unit for a high-output motor is used as the servo control circuit, it will be possible to drive a low-output motor.

Figure 6:
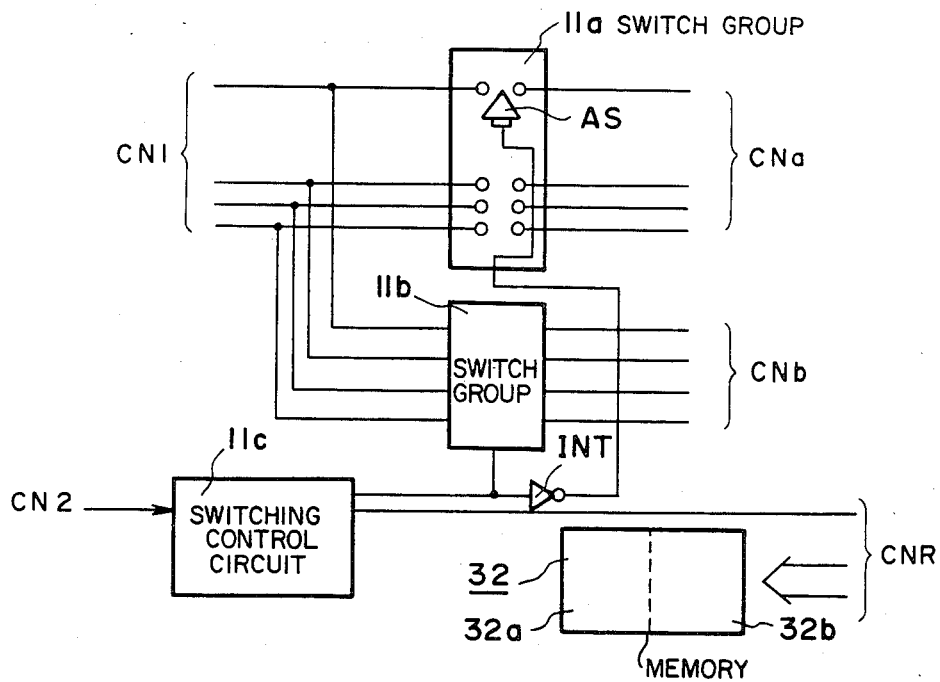
FIG. 6 illustrates the details of a principal portion of the arrangement illustrated in FIG. 5.
Figure 5:
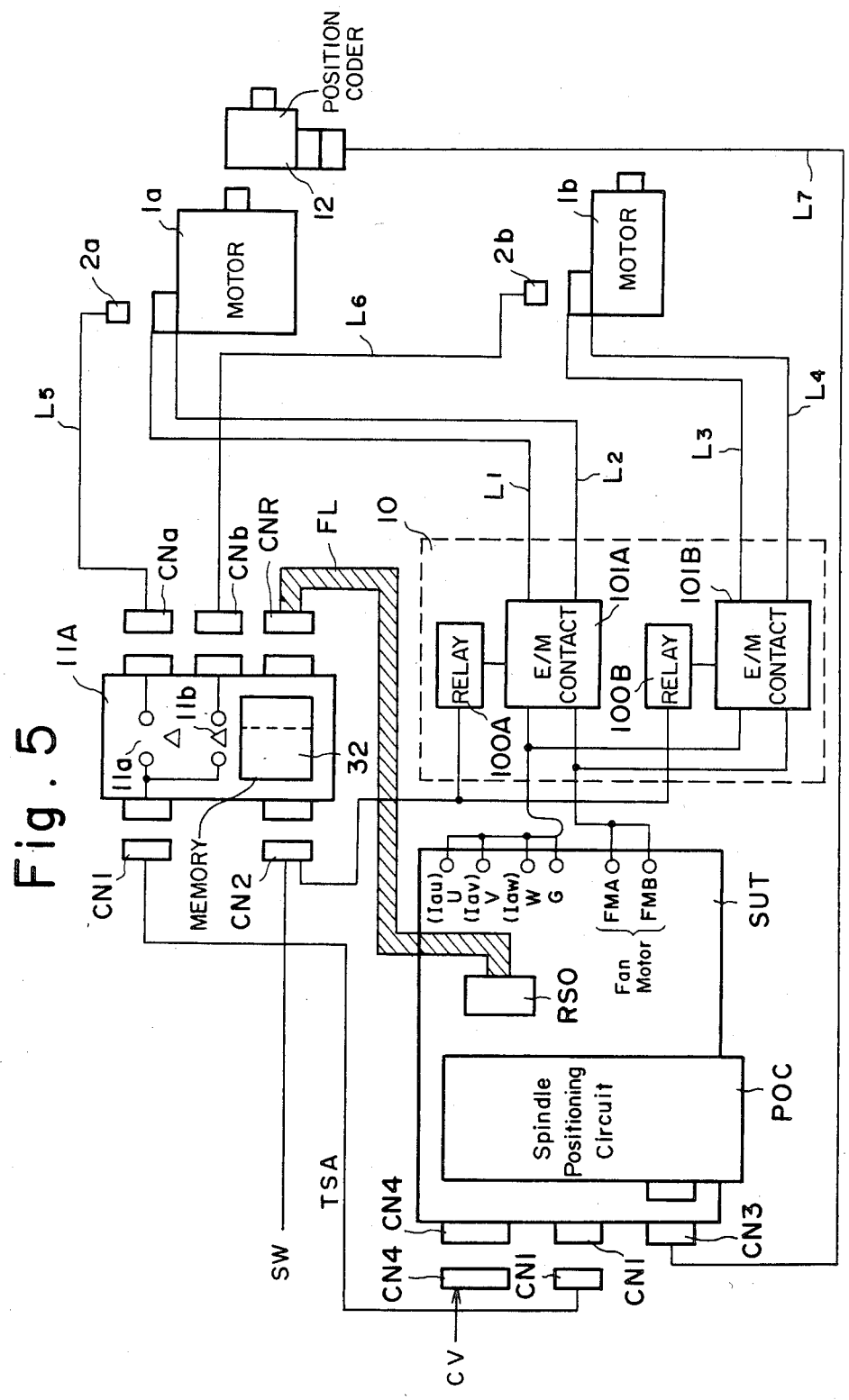
FIG. 5 is a switching circuit arrangement of the present invention.

FIG. 5 is a block diagram showing the details of a plural motor switching circuit arrangement according to the present invention. FIG. 6 is a view showing the details of a principal portion of the arrangement illustrated in FIG. 5. In these Figures, portions similar to those of FIG. 1 are denoted by like reference characters. SUT represents a servo control circuit consisting of a printed circuit board on which there are mounted the components of the arithmetic circuit of FIG. 1 with the exception of the data memory 32, the DA converters 4a through 4c, the W-phase current forming circuit 5, the operational amplifier 6, the pulse-width modulating circuit 7 and the inverter circuit 8. The servo control circuit SUT has a connector CN4 for receiving velocity commands and switching commands, etc., from a spindle control section of an external NC unit, and for the exchange of other data and commands, a connector CN1 for receiving a velocity command signal from a switching circuit described below, a connector CN3 for receiving a fixed velocity pulse from a position coder 12 via a line L7, output terminals U, V, W, G for U, V, W and G (ground) phases, which are the outputs of the inverter 8, and fan motor output terminals FMA, FMB. POC denotes a circuit for stopping a spindle at a predetermined position. The circuit POC receives the fixed velocity pulse applied through the connector CN3 and controls the stopping of the induction motor 1a. The POC circuit is not illustrated in FIG. 1. Numeral 10 denotes the power line switching circuit of FIG. 1. The circuit has relays 100A, 100B, as well as electromagnetic contacts 101A, 101B, which correspond to the induction motors 1a, 1b. In accordance with an externally applied switching signal, the switching circuit 10 connects or disconnects the output terminals U, V, W, G of the servo control circuit SUT and lines L1, L3, and connects or disconnects the fan motor output terminals FMA, FMB and lines L2, L4. Numeral 11A designates a cross board equipped with the signal line switching circuit 11 and the data memory 32 of the arithmetic circuit 32 shown in FIG. 1. As shown in detail in FIG. 6, the cross board 11A has a pair of analog switch groups 11a, 11b, and the data memory 32 storing the above-mentioned conversion tables. In accordance with a switching signal SW provided via the connector CN2, a switching control circuit 11c turns on either of the analog switch groups 11a, 11b so that velocity pulses from pulse generator 2a or 2b are transmitted to the connector CN1 through connector CNa or CNb. The analog switch groups 11a, 11b each have analog switches AS (e.g., FETs) the number of which corresponds to the number of lines (four in the illustration). These analog switches are operated by the power supply voltage provided by the servo control circuit SUT via a flat cable FL and a connector CNR. The data memory 32, which stores the conversion table 32a for the induction motor 1a and the conversion table 32b for the induction motor 1b, is connected via the connector CNR, flat cable F1 and a connector RSO to the bus 36 of the arithmetic circuit 3 mounted on the servo control circuit SUT.

The operation of FIG. 5 will now be described. When the switching signal SW for selecting the induction motor 1a is provided by the NC unit, the signal is applied to the switching control circuit 11c (FIG. 6) through the connector CN2 to turn on each of the analog switches AS in the analog switch group 11a. This applies the velocity pulses from the pulse generator 2a to the servo control circuit SUT (counter 35) through the line L5, connector CNa, analog switch group 11a and connector CN1. Further, due to the switching signal SW, relay 100A of the power line switching circuit 10 is actuated to turn on the electromagnetic contact 101A to connect the output terminals U, V, W, G of the servo control circuit SUT with the line L1, and to connect the output terminals FMA, FMB with the line L2. Further, the switching signal SW enters the servo control circuit SUT through the connector CN2 and flat cable FL, so that the arithmetic circuit 30 selects the conversion table 32a of data memory 32 through the flat cable FL. Accordingly, the servo control circuit SUT, based on the velocity command CV received through the connector CN4, and in accordance with the velocity pulses from the pulse generator 2a, retrieves the conversion table 32a of the data memory 32 through the flat cable FL, generates the drive currents in each phase at the output terminals U,V, W and G, and applies these to the induction motor 1a through the line L1 to control the induction motor 1a in the manner described in connection with FIG. 1. Furthermore, the servo control circuit SUT delivers a fan motor drive signal via line L2 to drive the fan motor of the induction motor 1a. When a switching signal SW for selecting the induction motor 1b is applied, on the other hand, the foregoing operation is reversed. That is, each of the analog switches AS in the analog switch group 11b is turned on. This applies the velocity pulses from the pulse generator 2b to the servo control circuit SUT, relay 100B of the power line switching circuit 10 is actuated to turn on the electromagnetic contact 101B to connect the output terminals U, V, W, G of the servo control circuit SUT with the line L3, and to connect the output terminals FMA, FMB with the line L4. The arithmetic circuit 30 selects the conversion table 32b of data memory 32 through the flat cable FL. Accordingly, the servo control circuit SUT, based on the velocity command CV received through the connector CN4, and in accordance with the velocity pulses from the pulse generator 2b, retrieves the conversion table 32b of the data memory 32 through the flat cable FL, generates the drive currents in each phase at the output terminals U, V, W and G, and applies these to the induction motor 1b through the line L3 to control the induction motor 1b. Likewise, the fan motor of the induction motor 1b is driven by a fan motor drive signal provided by the output terminals FMA, FMB of the servo control circuit SUT via the electromagnetic contact 101B and line L4. Since the cross panel 11A is thus constructed of analog switches, a power supply or the like for driving relays is unnecessary. The power line switching circuit 10, on the other hand, handles large currents and high-power drive signals and is constructed of relay circuitry since analog switches cannot be used due to their low breakdown voltage.

In the foregoing description, one and the same data memory 32 stores the conversion tables 32a, 32b having the motor characteristics for two induction motors. However, the two conversion tables can each be stored in a separate memory. Further, the conversion tables are switched between by the processor 30 delivering a switching signal to the switching circuit 10 in accordance with a program. However, the switching operation can be performed in response to an externally applied switching signal. In addition, where it is required that various portions of the servo control circuit be initially cleared, this can be accomplished by a switching operation performed after the power supply has been turned off once, or by a clearing operation performed by the processor 30.

The present invention is not limited to the above-described embodiment but can be modified in various ways without departing from the scope of the invention.

The present invention is well-suited for application to a numerically controlled machine tool equipped with a plurality of induction motors the outputs of which differ. However, the invention is not limited to such application but can also be utilized in other equipment that include a servo mechanism, such as in robot mechanisms.

We claim:

1. A plural motor changeover control system for a plurality of motors, each having different power output characteristics and in which switching among the motors occurs, said system comprising:
   identical sensors connected to said motors;
   a single servo control circuit for controlling the motors; and
   velocity error-amplitude command means, having conversion tables each corresponding to one of said motors and operatively connected to said single servo control circuit, for selecting the one of the conversion tables corresponding to the motor designated for operation from among said plurality of motors, for fetching an amplitude command, from said selected conversion table, corresponding to a velocity error which is a difference between an actual velocity of said designated motor and a commanded velocity, and for applying the amplitude command to said servo control circuit to control the designated motor each conversion table compensating for the output produced by the corresponding sensor.

2. A plural motor changeover control system according to claim 1, wherein said motors are induction motors.

3. A plural motor changeover control system having a plurality of motors, each having different power output characteristics, said system comprising:
- identical sensors operatively connected to said motors and producing sensor signals;
- a power line switching circuit operatively connected to said motors;
- a servo control circuit, operatively connected to said powerline switching circuit, said plurality of motors being switched among and being connected to said servo control circuit by said power line switching circuit; and
- a signal line switching circuit, operatively connected to said motors and said servo control circuit, for switching among, and applying to said servo control circuit, feedback signals from said plurality of motors, said signal line switching circuit including an analog switch and a conversion table for each motor, said servo control circuit controlling the selected motor in dependence on the selected sensor signal, the selected motor and an amplitude command using the conversion table correspoding to the selected motor, said conversion table compensating for the corresponding sensor.

4. A plural motor changeover control system according to claim 3, wherein said servo control circuit includes a power supply and said analog switch is operated by the power supply of said servo control circuit.

5. A plural motor changeover control system according to claim 3, further comprising:
- a memory for storing the conversion tables; and
- a printed circuit board, and said signal line switching circuit is mounted on the printed circuit board on which there is mounted the memory storing the conversion tables exhibiting power characteristics corresponding to said motors, the power outputs of which differ.

6. A plural motor changeover control system according to claim 4, further comprising:
- a memory for storing the conversion tables; and
- a printed circuit board, and said signal line switching circuit is mounted on the printed circuit board on which there is mounted the memory storing the conversion tables exhibiting power characteristics corresponding to said motors, the power outputs of which differ.

7. A motor control system receiving a commanded speed, comprising:
- at least a first motor having a first actual speed indicator and a first motor current sensor;
- at least a second motor having a second actual speed indicator and a second motor current sensor and having a power output rating different from said first motor, the first and second motor current sensors being identical;
- sensor switching means, operatively connected to the first and second actual speed indicators, for switching between the first and second actual speed indicators;
- power supply switching means, operatively connected to said first and second motors, for switching the supply of power between said first and second motors; and
- control means, operatively connected to said sensor switching means and said power supply switching means, for switching said sensor switching means to one of the first and second actual speed indicators, for switching the power supply switching means to supply power to the corresponding motor, for computing an error between the commanded speed and an actual speed and for applying power to the corresponding motor in dependence upon the error and the power output rating of the motor in accordance with the error/power conversion table corresponding to the motor being controlled, the error/power conversion table compensating for the corresponding sensor.

8. A motor control system according to claim 6, wherein said control means comprises:
- a memory storing the error/power conversion table for each motor; and
- a processor, operatively connected to said memory, said sensor switching means and said power supply switching means, for controlling the switching by said sensor switching means and said power supply switching means, for computing the error, for accessing the error/power conversion table corresponding to the motor and reading out the power to be applied in dependence upon the computed error and for controlling application of the power to be applied.

9. A motor control system according to claim 7, wherein the error/power conversion table comprises:
- an error/current amplitude conversion table;
- an error/phase conversion table;
- an error/slip conversion table; and
- an actual speed/angular frequency conversion table.

* * * * *